United States Patent
Thiel et al.

(10) Patent No.: US 6,381,509 B1
(45) Date of Patent: Apr. 30, 2002

(54) AUTOMATIC MANUFACTURING MONITORING AND TRACKING

(75) Inventors: Brian M. Thiel, Mason; Guy E. Schalnat, Middletown; Marilyn K. MacDonald, Loveland; Gary E. Kleeman, West Chester, all of OH (US)

(73) Assignee: Mattec, Inc., Loveland, OH (US)

( * ) Notice: Subject to any disclaimer, the term of this patent is extended or adjusted under 35 U.S.C. 154(b) by 0 days.

(21) Appl. No.: 09/184,495

(22) Filed: Nov. 2, 1998

(51) Int. Cl.$^7$ .............................................. G06F 19/00
(52) U.S. Cl. ...................... 700/115; 700/95; 700/116; 700/222; 700/225; 700/226; 700/227; 382/306; 382/305; 382/282
(58) Field of Search .............................. 700/95, 96, 99, 700/100, 101, 102, 103, 104, 108, 109, 110, 111, 112, 115, 116, 117, 121, 215, 221, 222, 224–227, 229; 382/306, 282, 305

(56) References Cited

U.S. PATENT DOCUMENTS

| | | | |
|---|---|---|---|
| 4,591,983 A | | 5/1986 | Bennett et al. .............. 364/403 |
| 4,819,176 A | | 4/1989 | Ahmed et al. ............... 364/468 |
| 4,821,197 A | | 4/1989 | Kenik et al. ................. 364/468 |
| 5,150,288 A | * | 9/1992 | Imai et al. ...................... 700/3 |
| 5,231,585 A | * | 7/1993 | Kobayashi et al. ........... 700/95 |
| 5,495,417 A | * | 2/1996 | Fuduka et al. ................ 700/95 |
| 5,586,038 A | | 12/1996 | Nagaoka ................. 364/468.01 |
| 5,673,194 A | | 9/1997 | Cipelletti et al. ....... 364/468.22 |
| 5,777,876 A | * | 7/1998 | Beauchesne .................. 700/95 |
| 5,781,443 A | | 7/1998 | Street et al. ............ 364/478.02 |
| 5,794,830 A | * | 8/1998 | Crowley ....................... 226/24 |
| 5,801,946 A | * | 9/1998 | Nissen et al. ................. 700/95 |
| 5,896,293 A | * | 4/1999 | Teramoto et al. ........... 700/117 |

OTHER PUBLICATIONS

Wonderware Corporation, *Solutions Guide To Third Party Products: A Comprehensive Guide to Software/Hardware Solutions*, 1996 Cahners Publishing Co.

* cited by examiner

Primary Examiner—Rameph Patel
(74) Attorney, Agent, or Firm—Wood, Herron & Evans, L.L.P.

(57) ABSTRACT

A computerized system for tracking the activities of a manufacturing system. Identifiers for parts, subassemblies or assemblies produced or used by the manufacturing system are generated and stored by a data processing system. The data processing system performs multi-level tracking of the manufacture of parts, subassemblies made from parts and assemblies made from parts and subassemblies, to facilitate detailed tracking and reconstruction of the manufacturing process and components of any assembly. The system also facilitates quality control; when a part identifier is read from the part, the system verifies that the part associated with the read identifier is supposed to be used in the manufacturing step. Also, the system ensures that all manufactured parts are tracked. The system also stores inspection and process conditions and facilitates statistical process control or statistical quality control data for parts, subassemblies and assemblies. The system can determine that an assembly has been produced by a manufacturing step when identifiers for all required parts identified in manufacturing data for the process step have been read and verified. Alternatively, upon detecting cycles of the manufacturing system indicative of completion of a manufacturing step, the system can determine that an assembly or part has been produced. In either case, the system generates an identifier for the part or assembly produced by the manufacturing step.

66 Claims, 7 Drawing Sheets

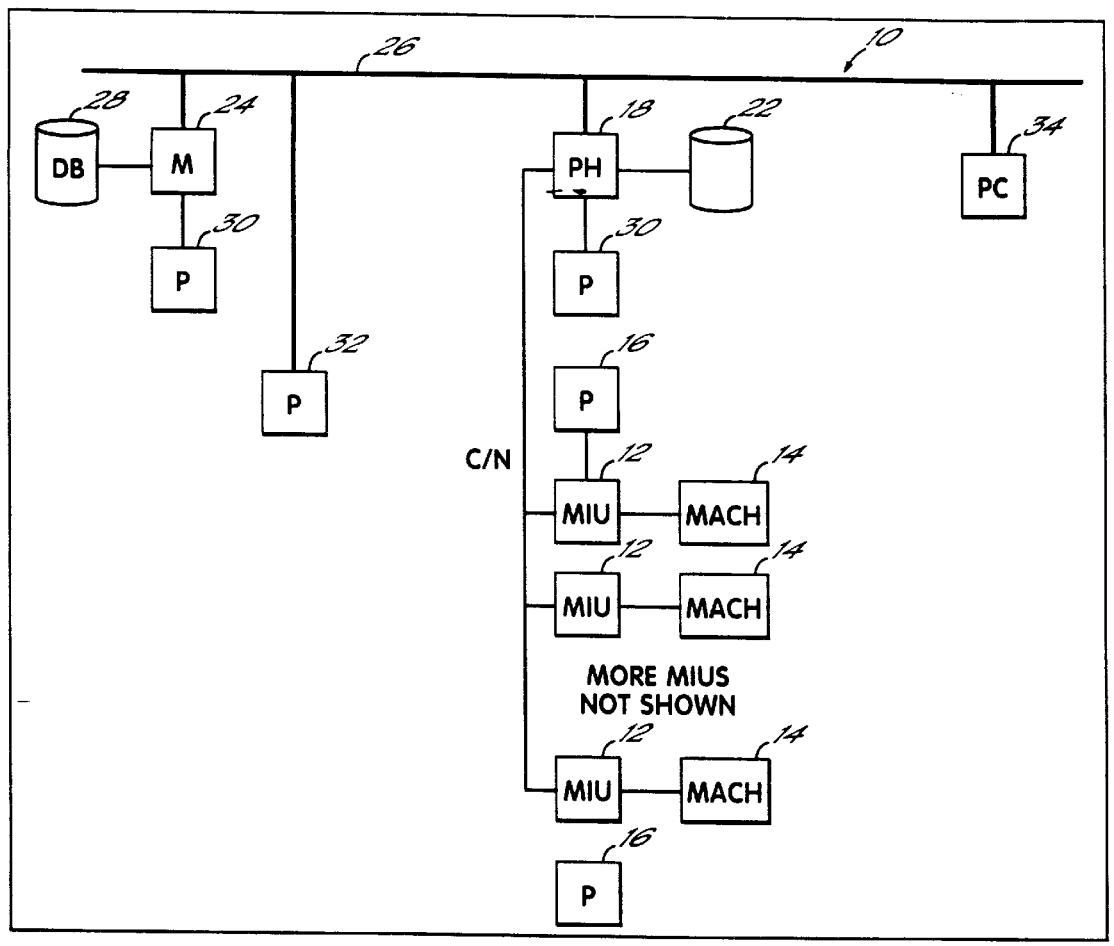
FIG. 1
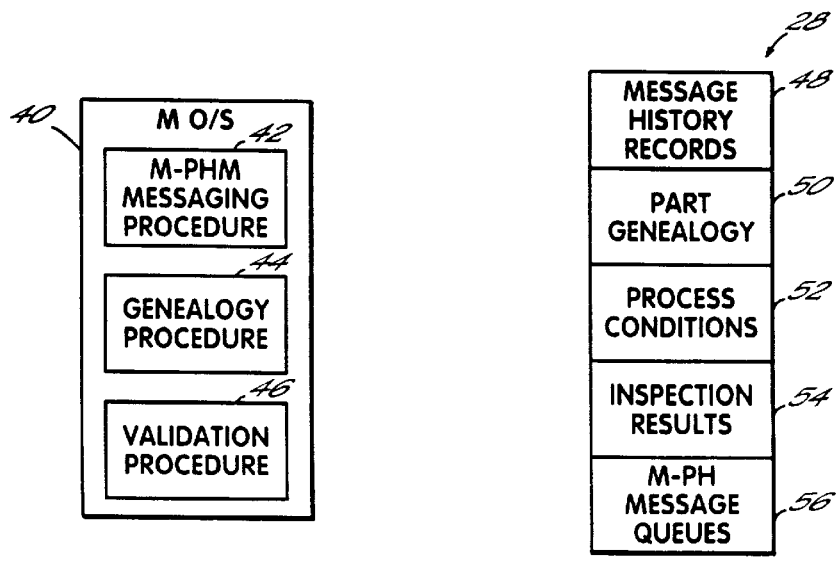
FIG. 2
FIG. 3

AUTOMATIC MANUFACTURING MONITORING AND TRACKING

FIELD OF THE INVENTION

The present invention relates to automatic systems for monitoring and tracking product manufacturing.

BACKGROUND OF THE INVENTION

In the modem era, product recalls, liability lawsuits, and warranty claims are an unfortunate but common part of the life of a manufacturing company. Even the best managed manufacturing operations are subject to producing defective merchandise requiring recalls. Furthermore, liability lawsuits and warranty claims may be made whether there is or is not a defect underlying the claim.

In this environment, it is critical to the profitability of a manufacturing organization, to improve quality control and minimize defects. Furthermore, since defects and claims asserting defects are to some extent unavoidable, it is critical to collect data on a manufacturing operation. When a defect occurs, such data will permit a subsequent determination of the cause of the defects and identification of specific lots, batches or individual manufactured products subject to these defects, so that recalls can be narrowly targeted and not over-inclusive. When a claim asserting a defect is made, such data can be used as evidence to refute allegations that improper manufacturing practices created a defect and/or to statistically prove that an acceptable number on defects exist within all manufactured parts.

In the past, computerized systems have been incorporated into manufacturing environments to address some of the concerns identified above.

For example, Cipelletti, U.S. Pat. No. 5,673,194 discloses a computer system for an electronics manufacturing environment in which circuit boards, having been previously assigned identifiers, are tracked through assembly workstations. The times at which the boards pass through the workstations are collected, as is data on the workstation operator, or its current operative parameters. This data can be later assembled, using time as an index, to determine the full manufacturing history of any one or group of circuit boards.

Nagaoka, U.S. Pat. No. 5,586,038, at col. 3, lines 55–67, describes an automobile manufacturing environment in which the serial numbers of parts assembled to a vehicle and the serial number of the vehicle frame are collected and stored as the parts are assembled to the vehicle. Manufacturing parameters such as torques applied in assembly of the part to the vehicle, are also collected and related to the serial number of the vehicle. Other systems for collecting and tracking manufacturing data are also known. Bennett, U.S. Pat. No. 4,591,983 discloses a database for storing configuration information for custom-assembled computer systems, including identifying parts and subassemblies of parts assembled into the computer systems. The assignee of the present patent application markets software and hardware systems for collecting and storing environmental data from a manufacturing environment each time a manufacturing machine cycles. A software product sold by Wonderware, known as Intrack, is a database for resource tracking and management for manufacturing environments, primarily intended for tracking and predicting the availability of supplies and inventory. In Intrack, typically batches of inventory or supplies are provided with identifiers and bar-coded. As these batches pass through the manufacturing system, the bar codes are scanned and the Intrack software maintains an updated record of the status of each batch, from which reports and predictions can be made.

The foregoing systems suffer from several difficulties. First, the approaches of Cipelletti and Nagaoka assume that the manufacturing process will begin with a substrate (Cipelletti) or framework (Nagaoka) which can be subsequently identified and to which all of the parts will be assembled. That is, the circuits made by Cipelletti in all cases include a circuit board, and the identifier for this circuit board is visible in the final product. Similarly, the vehicles made by Nagaoka in all cases include a frame and the frame's identifier is visible in the final product. Unfortunately, this is not always the case. Some manufactured products do not have a underlying substrate or framework to which other parts are assembled. Furthermore, in some manufactured products the identifiers for some or all of the parts are permanently hidden when the parts are assembled. In each case, it would be impractical to use the Cipelletti/Nagaoka approach.

Another difficulty with the Cipelletti/Nagaoka systems is that tracking and identification are performed only at the level of the final assembly. Presumably, other systems are relied upon to identify defects which may occur in the manufacture of subassemblies assembled onto the final assembly tracked by Cipelletti or Nagaoka. This can lead to substantial difficulties. Specifically, inaccuracy in the tracking of the subassemblies can substantially undermine the cost effectiveness of the system. For example, if a part manufacturer determines that defects may have occurred in any of the parts manufactured over a four-week period, but cannot more narrowly identify the defective parts, all of the assemblies produced using those parts must be recalled or inspected, at a potentially substantial cost. While the Cipelletti or Nagaoka system can accurately determine which final assemblies must be recalled, they can do nothing to identify the cause of defects in the subassemblies or narrow the number of subassemblies, and therefore the number of final assemblies, that must be recalled or inspected.

A third difficulty with the systems described thus far, is that they have no facility for monitoring manual assembly steps or attempting to compensate for human error in manual assembly. Several known systems have been directed specifically to manual assembly steps, with varied success. Ahmed, U.S. Pat. No 4,819,176 describes a shrimp cleaning and packaging environment in which a computer system tracks the weight of batches or sub-batches of raw shrimp and cleaned shrimp, and the employees involved in cleaning those batches or sub-batches. Street et al., U.S. Pat. No. 5,781,443 and Kunik et al., U.S. Pat. No 4,821,197 disclose manual assembly stations, having bins for storing parts to be used in manual assembly. A computer system generates displays over each bin to indicate the parts to be used, and sensors in the bins detect when parts have been retrieved from the bins.

Ahmed, Street et al. and Kunik et al., while aiding manual assembly and improving the tracking of manual assembly steps, fall short of ensuring that manual assembly is being performed correctly. Specifically, the Ahmed system is capable only of identifying when a manual shrimp cleaning operation is producing excessive waste, but not in verifying that the operation is being correctly performed. The Street et al. and Kunik et al systems, while assisting manual assembly of components, do not truly verify that the appropriate parts are being used in manual assembly or that all of the required parts are being used, since the sensors coupled to the bins could be "fooled", e.g., by a placing a hand into a bin without removing a part. Furthermore, none of Ahmed, Street et al. or Kunik et al provide facilities for tracking individual manual operations so that the parts used in the operation and the resulting assembly, and the identity of the assembler, can be cross-referenced.

SUMMARY OF THE INVENTION

The present invention overcomes these and other difficulties in the prior art, by providing a comprehensive manufacturing and tracking system. A system in accordance with the present invention is appropriate for any kind of assembly made by any kind manufacturing operation, including those which do not have or use a later-identifiable substrate or frame. In accordance with the present invention, tracking extends both to final assemblies as well as subassemblies used in forming final assemblies made from those subassemblies. Systems in accordance with the present invention are appropriate for use with both automated and manual assembly stations, and not only assist in manual assembly procedures but also verify that the appropriate parts are being used, in the proper order, in a manual assembly step.

In accordance with a first aspect, the invention features a computerized system for tracking the activities of a manufacturing system, the manufacturing system performing a manufacturing process in which an assembly is assembled from parts, at least some of the parts being assembled into a subassembly in a first manufacturing step prior to combining the subassembly with additional parts in a second manufacturing step. The invention can also be applied to single-step manufacturing environments, but this aspect of the invention is primarily applicable to multi-step manufacturing environments. Identifiers for parts, subassemblies or assemblies produced or used by the first and second manufacturing steps are stored and generated by a data processing system. The data processing system is responsive to the first and second manufacturing steps to produce and store identifiers for subassemblies produced in the first manufacturing step in synchrony with completion of the subassemblies by the first manufacturing step, and produce and store identifiers for assemblies produced in the second manufacturing step in synchrony with completion of the assemblies by the second manufacturing step. The resulting multi-level tracking of assembly steps and the subassemblies and assemblies produced by them, facilitates detailed tracking and reconstruction of the manufacturing process for an individual final assembly.

In another aspect, the invention features a computerized system for tracking the activities of a manufacturing system, in which a data processing system, upon receipt of a part identifier from an indicia reading system, retrieves from a data storage system, manufacturing step data for the manufacturing step, and verifies that the part associated with the read identifier is supposed to be used in the manufacturing step. If not, a warning can be generated, preventing inappropriate completion of a manufacturing step, particularly in manual assembly environments.

In a further aspect, the invention features a computerized system for tracking the activities of a manufacturing system, in which a data processing system determines that an assembly has been produced by a manufacturing step, when identifiers for all required parts identified in manufacturing data for the process step, have been read and verified. This facilitates manual assembly environments in particular, by ensuring that an identifier is generated for each part assembled, without requiring manual verification of the assembly of the part.

In an additional aspect, the invention features a computerized system for tracking the activities of a manufacturing system, in which a data processing system has sensors attached to the manufacturing system for detecting cycles of the manufacturing system indicative of completion of a manufacturing step, and generates an identifier for an assembly produced by the manufacturing step upon detection of completion of the manufacturing step, and stores the identifier. This analogously facilitates automated assembly, by ensuring an identifier is generated for each part that is made by a machine.

In specific embodiments of the invention, a bar code printer coupled to the data processing system prints a bar code when the data processing system produces an identifier for an assembly or subassembly. The bar code is printed on a sticker, which can then be either automatically or manually transferred onto the assembly or subassembly for which the identifier was generated. When a part or subassembly is used in a manufacturing step, a bar code reader reads the bar code from the part or subassembly, and delivers the identifier reflected in the bar code to the data processing system. In alternative embodiments, the bar code or other indicia can be scribed on the part, e.g. by a laser scribing system.

The data processing system, upon receipt of a series of identifiers from scanned bar codes, may evaluate whether identifiers for parts or subassemblies, were received in an order in which the parts or subassemblies are supposed to be used in the given manufacturing step, and if not, issue a warning. This further ensures that manual assembly procedures in particular are being correctly performed.

When the data processing system receives an identifier for a subassembly being combined into an assembly, the data processing system stores into the data storage system, an association between an identifier generated for the first subassembly to an identifier generated for the first assembly. This accumulated data facilitates later retrieval of the identifiers for individual component parts that are incorporated into an assembly.

The data processing system also includes sensors attached to the manufacturing system for collecting process condition measurements relating to performance of manufacturing steps. The data processing system associates these measurements with the identifier of the assembly or subassembly produced during performance of the manufacturing step.

The data processing system may also include a user interface for obtaining inspection information relating to the manufacturing system. The data processing system stores inspection information relating the manufacturing system's performance of a manufacturing step, associated with an identifier generated for an assembly or subassembly produced during performance of the manufacturing step.

The data processing system can use the rate of generation of identifiers for assemblies or subassemblies produced during performance of a manufacturing step, to forecast future availability of assemblies or subassemblies produced by the manufacturing step based on the determined rate. This analogously facilitates production monitoring for automatic and manual assembly operations.

In accordance with further aspects, the invention features methods carried out by the computer systems described above.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above and the detailed description of the embodiments given below, serve to explain the principles of the invention.

FIG. 1 is a block diagram of a computer network suitable for carrying out the present invention;

FIGS. 2 and 4 are software diagrams of the critical procedures operating on the genealogy server and production and process monitoring host of FIG. 1;

FIGS. 3 and 5 are data structure diagrams of the data stored in the genealogy server and production and process monitoring host databases of FIG. 1;

DETAILED DESCRIPTION OF SPECIFIC EMBODIMENTS

Figure 4:
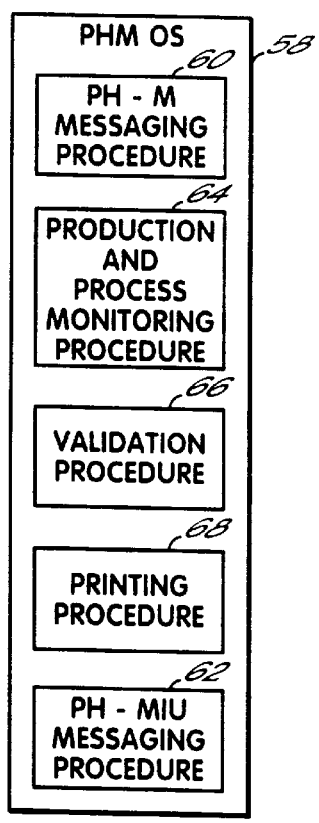

Referring now to the FIGS., the detailed operation of a system for carrying out the invention can be explained.

As seen in FIG. 1, a computing system for carrying out the invention comprises a network 10 of computers including client and server computers, as well as special purpose computers for interfacing with bar code scanners, process condition sensors and manufacturing machines. At the lowest level, the network 10 comprises machine interface units (MIU's) 12, three of which are shown in FIG. 1. MIU's are special purpose computers designed for use in manufacturing environments and interfacing with scanners, process condition sensors and manufacturing machines and/or manual assembly operations. An exemplary special purpose computer that can be used as an MIU, is available as part number MIU-5XS or MIU-10X, available from the assignee of the present application. Furthermore, a suitably configured PC-compatible microcomputer using Windows 95 or a similar operating system, can be used as an MIU.

MIU's 12 are respectively connected to manufacturing machines 14 for collecting data therefrom. These connections may be used to collect process data from the manufacturing machine such as temperatures, pressures, operating torques or forces. Furthermore, these connections may be used to receive, from the manufacturing machine, electrical signals indicative of cycling of the machine. For example, an injection molding machine may produce an electrical pulse each time the mold opens, which pulse can be detected by an MIU. An MIU is configured and equipped as needed to collect the desired process data or electrical signals from the associated machine, for the application at issue. An MIU may also output control signals to a machine. For example, an MIU may control a relay between an open and closed condition, to send an electrical signal to a manufacturing machine, or to illuminate a warning light and/or sound a warning horn, or for other purposes. Exemplary applications are discussed below.

MIU's 12 may be further configured to support a printer 16. Two printers connected to two of the MIU's 12 are shown in FIG. 1. Printers 16 are typically bar code printers which generate a bar code in response to a print command received by the MIU 12. When a printer is attached to an MIU, the MIU is configured with suitable driver software for controlling the printer.

One or more MIU's 12 are connected to a production and process monitoring host computer (PH) 18 via a network or cabling 20. Serial port connections, or network connections such as Ethernet or token ring may be used for connection between MIU's 12 and PH 18, the only requirement being that each MIU be provided two-way communications to/from the associated production and process monitoring host 18. Production and process monitoring host 18 is interconnected with a data storage device (I) 22 for storing data utilized by production and process monitoring host 18 in managing operation of its interconnected MIU's, as will be seen below. Production and process monitoring host 18 may further be interconnected with a printer 16, which is typically a bar code printer, but may also print reports upon actions monitored by the MIU's. In either case, production and process monitoring host 18 includes software for driving the printer.

The production and process monitoring host 18 is responsible for managing the collection and initial analysis of data from a manufacturing step in the manufacturing system, and each of the MIU's attached to production and process monitoring host 18 is coupled to machinery or systems utilized in the manufacturing step. FIG. 1 illustrates one assembly of a production and process monitoring host 18 and associated MIU's, with three MIU's being illustrated connected to three manufacturing machines. Additional MTU's may be included in the assembly of production and process monitoring host 18 and its associated MIU's, as is desired to collect the required data. Furthermore, although only one PH/MIU assembly is shown in FIG. 1, it will be appreciated that a manufacturing environment may include a plurality of such assemblages, but typically will have just one such assemblage. The specific structure of each PH/MIU assemblage will be selected as needed for the data to be collected for the manufacturing step. Specific examples of several types of manufacturing steps will be provided below.

Production and process monitoring host 18 may be a PC-compatible microcomputer operating under the UNIX, WindowsNT or Windows95 operating system or another suitable operating system including networking and communications support sufficient to interface production and process monitoring host 18 to cabling or a network interface.

Production and process monitoring host 18 are connected to a main genealogy server (M) 24 via a network 26. As will be seen below, genealogy server M manages databases of parts, subassemblies and assemblies being used and produced by manufacturing steps managed by PH/MIU assemblages. Genealogy server (M) 24 stores this genealogy data in a database DB 28 connected to server M. The content of this database 28 will be explored in greater detail below. Genealogy server 24 further includes a connection to a printer 30 for printing bar codes for assemblies or subassemblies, or for producing reports on the operations of the manufacturing system.

It will be appreciated that the functions of the genealogy server 24 and production and process monitoring host 18 could be performed on a single computer server, and such an approach is within the scope of the present invention.

Genealogy server 24 is preferably a high-speed, high capacity network server, for example a server configured for operation under the Windows NT, UNIX or Novell NetWare operating systems. Server 24 is preferably connected to large capacity mirrored or otherwise error-tolerant storage devices for storing database 28. Server 24 runs server-side database software suitable for a multi-access, database, such as software supporting a standard query language (SQL) interface.

As is conventional, network 26 may further include directly connected printers such as 32, or microcomputers such as PC 34. These additional microcomputers on network 26 may communicate with genealogy server 24 to print bar codes or reports produced by genealogy server 24, and/or to request or obtain data from genealogy server 24.

Referring now to FIG. 2, the software structure of the software on genealogy server 24 can be described. The genealogy server 24 operates an operating system 40 supporting a number of applications carrying out the present invention. These applications include a messaging procedure 42 for managing the transfer of messages between genealogy server 24 and individual production and process monitoring host computers 18. Further, genealogy server applications include a genealogy procedure 44 which manages the databases of identifiers of parts, subassemblies and assemblies, and the relationships between parts, subassemblies and assemblies. The genealogy procedure is responsive to requests to generate new identifiers and/or to generate relationships between identifiers, as discussed below. Furthermore, the genealogy procedure produces reports on the relationships between identifiers as needed to reconstruct manufacturing processes and the components included in assemblies. Finally, the validation procedure 46 interacts with the databases of parts, subassemblies and assemblies to validate identifiers of parts scanned during the manufacturing process. Further details of the operations of the genealogy server 24 software will be provided below in connection with FIG. 8.

Referring now to FIG. 3, the data stored by the genealogy server 24 in database 28 can be discussed. This data includes history records 48, which is a collection of all messages transferred to the genealogy server 24. Furthermore, a part genealogy database 50 stores records of the relationships between parts, subassemblies and assemblies, as accumulated in response to messages transferred to genealogy server 24. A process conditions database 52 stores records of process conditions measured at the time of assembly of a subassembly or assembly and transferred to genealogy server 24. An inspection results database 54 stores records of inspection results of subassemblies or assemblies transferred to genealogy server 24. Finally, a queue 56 of M-PH messages is used by messaging procedure 42 to manage messages being transferred between genealogy server M 24 and production and process monitoring host PH 18.

Referring now to FIG. 4, the software structure of the production and process monitoring host 18 can be described. The production and process monitoring host operates an operating system 58 supporting a number of applications carrying out the present invention. These applications include a messaging procedure 60 for managing the transfer of messages between genealogy server 24 the production and process monitoring host 18. A second messaging procedure 62 manages the transfer of messages between production and process monitoring host 18 and individual MIU's 12. Further, the applications operating on production and process monitoring host 181 include a production and process monitoring procedure 64 which interprets messages from MIU's to determine whether the manufacturing process or the manufacturing step managed by the production and process monitoring host and MIU assemblage are operating correctly. In particular, the production and process monitoring host monitors the messages from MIU 12 to determine whether valid parts are being used, whether these parts are being used in the correct order, whether an assembly has been produced, and when to collect and deliver data to genealogy server 24. A validation procedure 66 is utilized by production and process monitoring host 18 to handle responses to validation requests made to genealogy server 24. Finally, a printing procedure 68 handles print messages produced by genealogy server 24 and routes these messages to the appropriate printer for printing. Further details of the operations of the production and process monitoring host software will be provided below in connection with FIGS. 7A, 7B and 7C.

Figure 5:
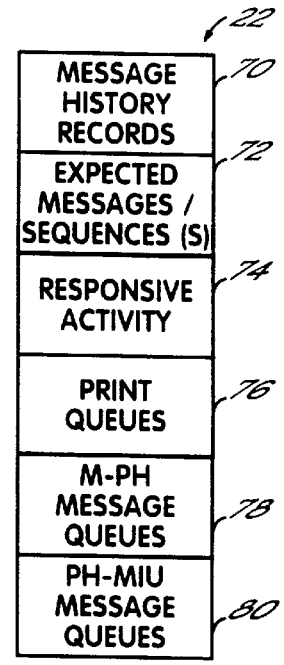

Referring now to FIG. 5, the data stored by the production and process monitoring host 18 in the data storage device 22 can be discussed. This data includes message history records 70, which are a collection of all messages transferred to the production and process monitoring host 18. Furthermore, an expected message and sequence description 72 is included in storage device 22. Description 72 is compared to the actual sequence of messages received from MIU's connected to the production and process monitoring host 18 to evaluate the appropriateness of the manufacturing step being performed by the equipment or personnel monitored by the production and process monitoring host 18 and its connected MIU's. Accompanying description 72 of expected messages and sequences is a description 74 of the responsive activity to be performed by production and process monitoring host 18 as part of the sequence of messages received from connected MIU's. Descriptions 72 and 74 are customized for a particular manufacturing step to provide the desired monitoring of that manufacturing step as is elaborated further below in connection with particular examples of manufacturing steps and the corresponding activity of production and process monitoring host 18. Storage device 22 further stores a queue 76 of information to be printed and is utilized by the printing procedure 68. An additional queue 78 is used by PH-M messaging procedure 60 to manage transfer of messages between genealogy server 24 and production and process monitoring host 18. A final queue 80 is used by PH-MIU messaging procedure 62 to manage transfer of messages between production and process monitoring host 18 and MIU's 12.

As discussed above, messages are transferred between production and process monitoring host 18 and genealogy server 24 as part of monitoring and managing a manufacturing process. Details of these messages can now be discussed.

Figure 6A:
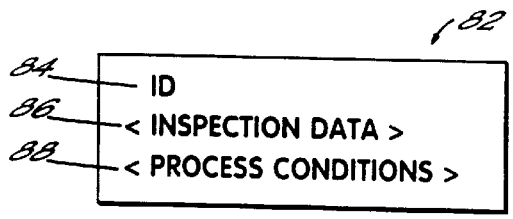
FIGS. 6A, 6B, 6C and 6D are data structure diagrams of messages transferred between the production and process monitoring host and genealogy server in carrying out the present invention.

A data storage message 82 is shown in FIG. 6A. Message 82 is transferred from a production and process monitoring host 18 to genealogy server 24 to request that data be stored by genealogy server 24 relating to a particular part, subassembly or assembly. The message includes a field 84 for an identifier for the part, subassembly or assembly about which data is to be stored. A further optional field 86 includes inspection data regarding that part, subassembly or assembly collected by the production and process monitoring host 18, and a further optional field 88 includes process condition data regarding the process of manufacturing a subassembly or assembly collected by the production and process monitoring host 18.

Figure 6B:

A validation request message 90 is shown in FIG. 6B. This message is transferred from production and process monitoring host 18 when validation of an identifier scanned from a part, subassembly or assembly is desired. The message includes a field 92 for the identifier that has been scanned. In response to this message, the genealogy server 24 determines whether the identifier is associated with a valid part, subassembly or assembly, and if so returns information regarding this part, subassembly or assembly, using a validation response message 106 as discussed below in connection with FIG. 6D.

Figure 6C:
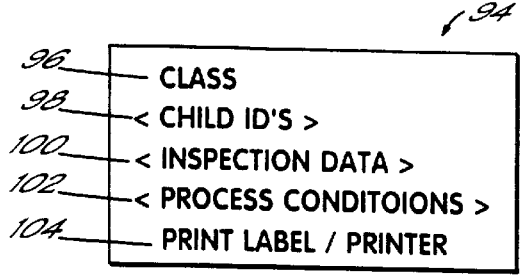

A identifier request message 94 is shown in FIG. 6C. This message is transferred from production and process monitoring host 18 to genealogy server 24 when production and process monitoring host 18 determines that a manufacturing step has been successfully performed and a new identifier should be assigned. The message includes a field 96 for identifying the class of part, subassembly or assembly for which the new identifier should be generated. A further optional field 98 is used to provide identifiers of "child" parts or subassemblies, i.e. identifiers of parts or subassemblies used in the manufacturing step and now incorporated into the new subassembly or assembly. This data is used to create a genealogy record linking the "child" parts or subassemblies to the new subassembly or assembly created therewith, as detailed below. A further optional field 100 includes inspection data regarding that part, subassembly or assembly collected by the production and process monitoring host 18, and a further optional field 102 includes process condition data regarding the process of manufacturing a subassembly or assembly collected by the production and process monitoring host 18. This data is stored in connection with the new identifier assigned to the new subassembly or assembly. A final field 104 identifies whether a label including a bar code for the newly-assigned identifier ought to be printed, and if so, the printer at which the label should be printed. These fields are used by the genealogy server 24 to generate a responsive print message as needed to cause a label to be printed for application to the new subassembly or assembly.

Figure 6D:
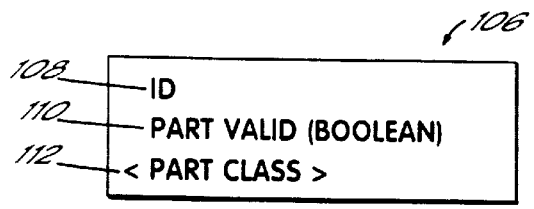

A validation response message 106 is shown in FIG. 6D. This message is transferred from genealogy server 24 to production and process monitoring host 18 when validation of an identifier scanned from a part, subassembly or assembly in response to a validation request message 90 (FIG. 6B) has been completed. The validation response message includes a field 108 for the identifier that has been validated a boolean field 110 indicating whether the identifier was determined to be valid, and can optionally include a field 112 (when a valid identifier was detected) which identifies the part by, for example, describing the class of the part, the part name, or other information.

Figure 7A:
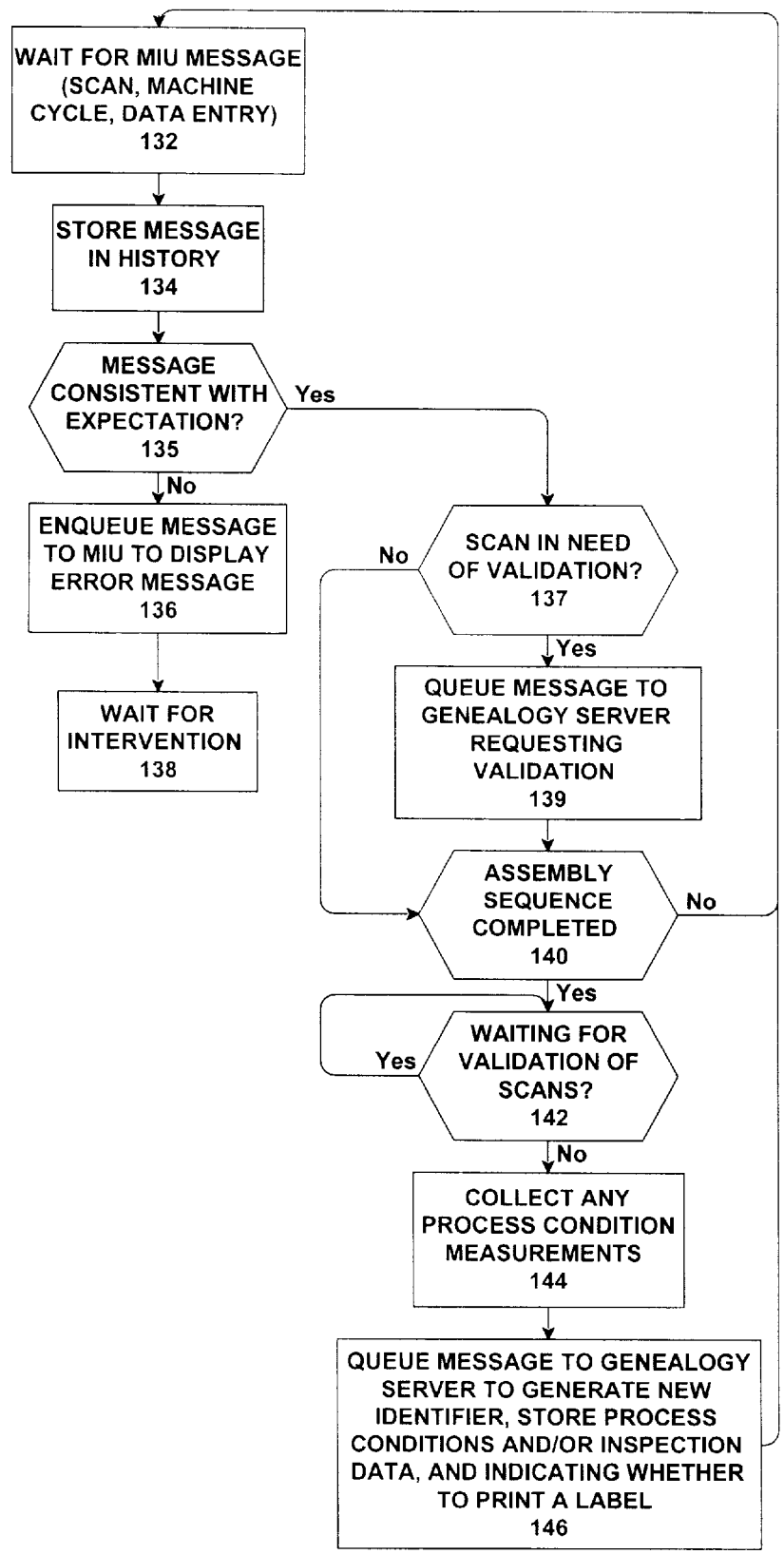
FIGS. 7A, 7B and 7C are flow charts of the production and process monitoring, validation and printing procedures operating on the production and process monitoring host of FIG. 1.

Referring now to FIG. 7A, the production and process monitoring procedure 64 performed by production and process monitoring host 18 can be discussed. This procedure is triggered by messages from the MIU's 12 coupled to the production and process monitoring host 18. Messages may be generated and delivered by an MIU 12 when a part or subassembly has been scanned by a bar code scanner connected to the MIU, or when a machine cycle is detected by the MIU, or when inspection data is entered into the MIU. In any of these cases, an MIU message is received by production and process monitoring host 18 at step 132. Subsequently, at step 134, the message is stored into the history records 70. Then, in step 135 the production and process monitoring host 18 evaluates the message to determine whether the message is consistent with expectations. In this process, the expected message sequence stored in area 72 of data storage 22 is compared to the current message and the prior messages received from MIU's. If the message is inconsistent with expectations, then in step 136 a message is enqueued to one or more MIU's to display an error message, and at step 138, the production and process monitoring host 18 waits for automatic or manual intervention before preceding further.

If in step 135 the received message is determined to be consistent with expectations, then in step 137 the message is evaluated in the context of the pre-defined responsive activity identified in area 74 of the data storage 22 connected to production and process monitoring host 18, to determine whether the message is a scan of a part or subassembly identifier in need of validation. If so, then in step 139 production and process monitoring host 18 queues a validation request message 90 to the genealogy server 24 requesting validation of the identifier received from the MIU. Thereafter, whether or not validation is needed, in step 140 the pre-defined expected message sequence identified in area 72 of the data storage 22, is evaluated to determine if an assembly sequence has been completed. If an assembly sequence has not been completed, then handling of the message is completed, and the procedure returns to step 132.

If the assembly sequence has been completed, then at step 142, a determination is made whether the production and process monitoring host 18 is currently awaiting a validation response message 106 in response to a previously generated validation request message 90. So long as the production and process monitoring host 18 is awaiting a validation response message, production and process monitoring host 18 remains in step 142. When the production and process monitoring host 18 is no longer awaiting a validation response message, then the production and process monitoring host 18 proceeds to step 144 in which the responsive activity stored in area 74 of the storage device 22 is retrieved and evaluated to determine whether process conditions are to be collected. If so, the process conditions are collected, either directly by the production and process monitoring host 18 or by communication with one or more MIU's 12. After collecting process conditions, as needed, a ID request message 94 is queued to the genealogy server 24 to request that a new ID be generated. Further, the message 94 includes child identifiers, inspection data, process conditions and a request to print a label and the location where to print the label, as appropriate in accordance with the responsive activity identified in area 74 of the storage device 22.

Figure 7B:
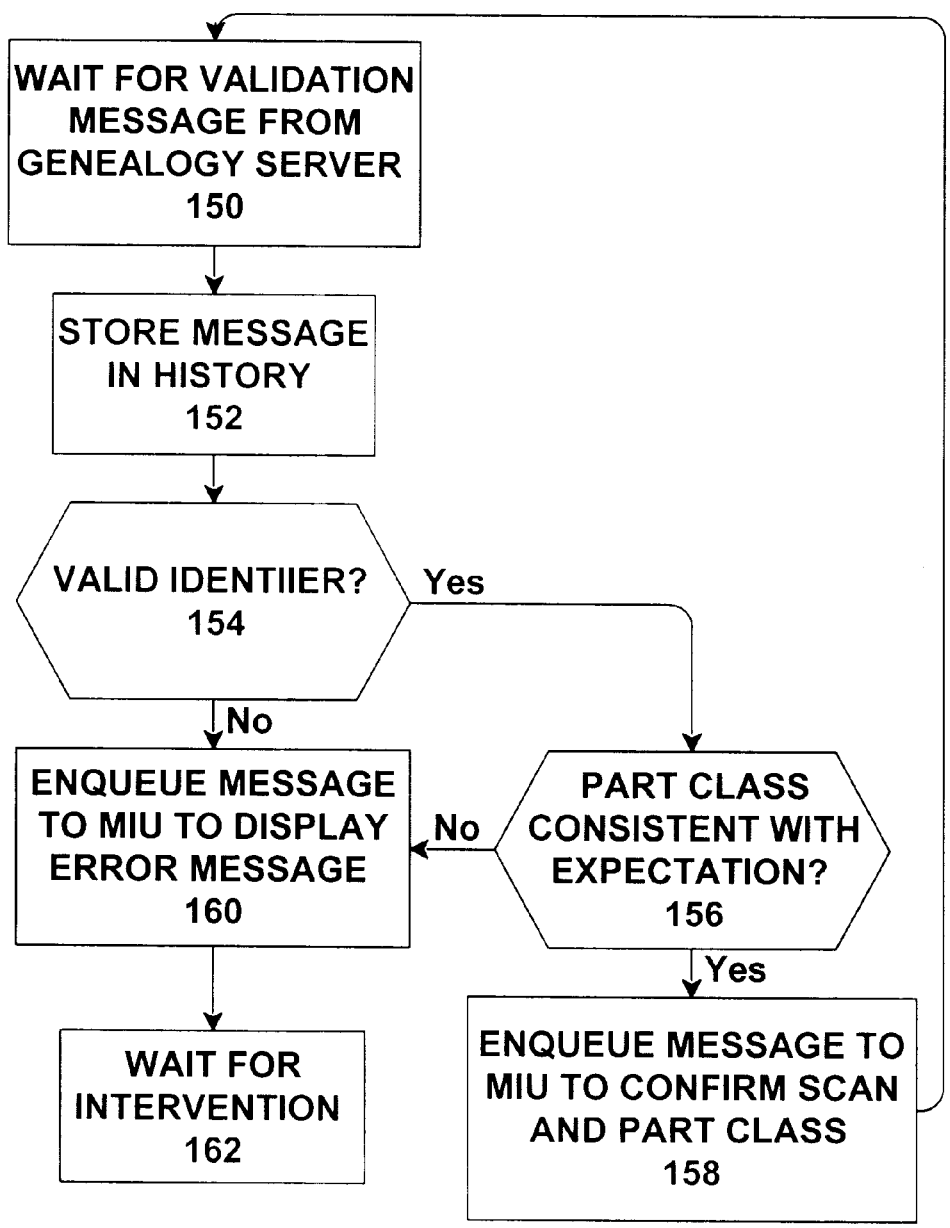

Referring now to FIG. 7B, the validation procedure 66 of the production and process monitoring host 18 can be discussed. This procedure commences at step 150, where the production and process monitoring host 18 waits for receipt of a validation response message 106 from the genealogy server 24. When such a message is received, in step 152 the message is stored in the history records 70 in the storage device 22. Next, in step 154, field 110 of the message is evaluated to determine whether it indicates that the identifier delivered to the genealogy server is valid, e.g., is a known identifier that the genealogy server database associates with an appropriate part, subassembly or assembly. If the identifier is determined to be valid, then in step 156, the class identified in field 112 of the message is compared to the expected message sequence described in area 72 of the storage device, to determine whether the class is consistent with expectations. In particular, if the expected message sequence described in area 72 indicates that a particular part class should be scanned as part of the manufacturing process, then the class identified by the returned validation response message is compared to the expected part class to determine whether the expectation has been met. If the expectation has been met, then in step 158, a message is enqueued to an MIU to display a confirmation of the scan and the part class. Typically, this message will be delivered to the same MIU that controls the bar code scanner used in scanning the part, although the production and process monitoring host 18 could be configured to display a confirmation of the scan and/or part class at another location.

If in step 154, the validation response message indicates that the identifier delivered by the validation request message is not a valid identifier, then the validation procedure proceeds to step 160. Similarly, if the class of the part is not consistent with expectations, then the validation procedure also proceeds to step 160. In either situation, an error has occurred; the manufacturing step is not being correctly performed, because an invalid part or an incorrect part is being used. Accordingly, in step 160, a message is enqueued to the MIU to display an error message, and thereafter in step 162 the production and process monitoring host 18 waits for automatic or manual intervention before proceeding further.

Figure 7C:
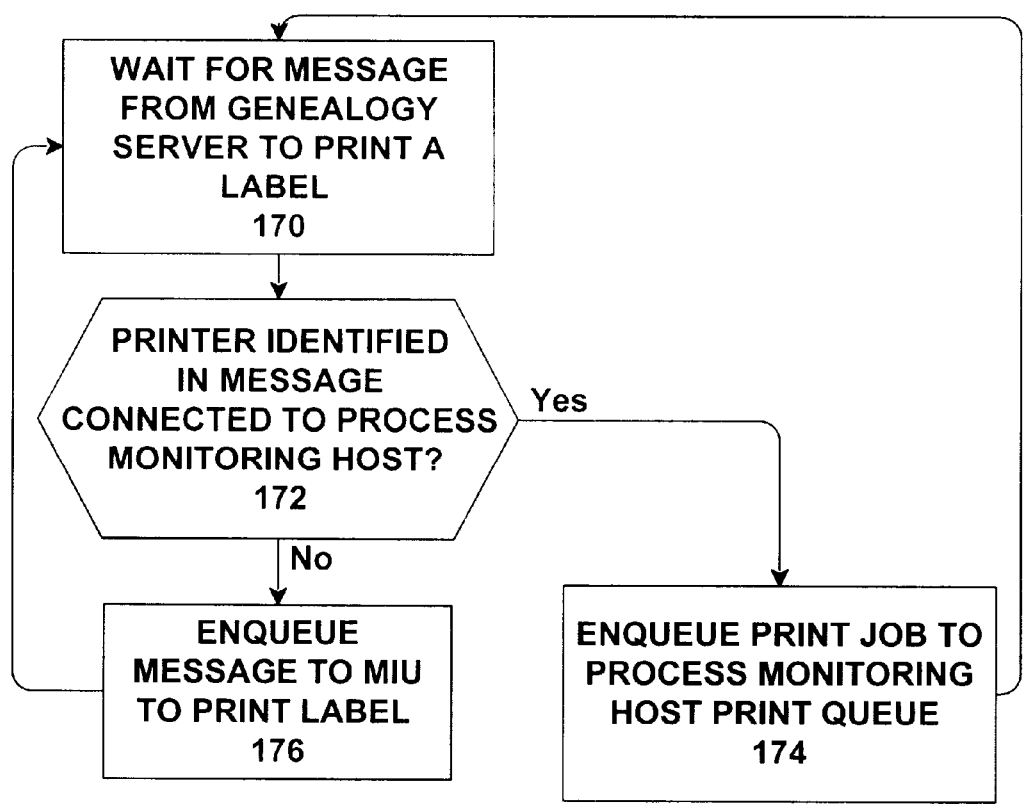

Referring now to FIG. 7C, the printing procedure of production and process monitoring host 18 is responsive to messages from the genealogy server 24 requesting that a bar code be printed. The procedure waits at step 170 for a print request message from the genealogy server, requesting that the production and process monitoring host 18 print a label. When a print request message is received, in step 172 the printer identified in the message is evaluated to determine whether the identified printer is connected to the production and process monitoring host 18. If so, then in step 174 a print job corresponding to the received print request message is enqueued to the identified printer, using the operating system software of the production and process monitoring host 18. If the printer identified in the print request message is attached to an MIU 12 in the assemblage including the production and process monitoring host 18, then in step 176 a message is enqueued to the MIU to print the associated bar code or other information.

Figure 8:
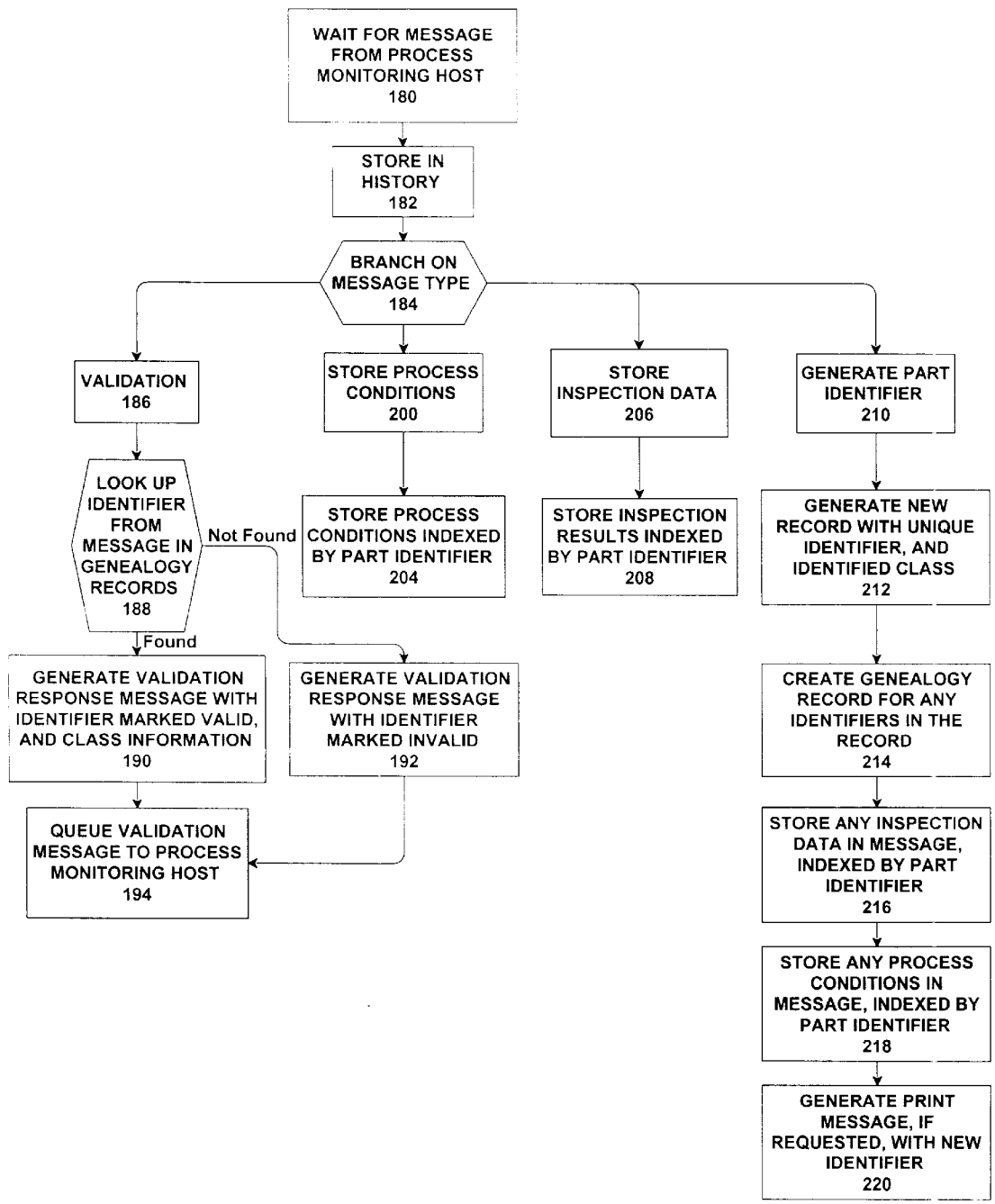
FIG. 8 is a flow chart of the validation and genealogy procedures operating on the genealogy server of FIG. 1.

Referring now to FIG. 8, the genealogy procedure 44 and validation procedure 46 of the genealogy server 24 can be discussed. Although these can be separate procedures operating on genealogy server 24, as illustrated in FIG. 2, each procedure responsive to specific types of messages, for the purposes of explanation, the actions of these procedures will be described in the context of a single flow chart in FIG. 8.

The genealogy procedure 44 waits in step 180 for a message from the production and process monitoring host 18. When a message is received, in step 182 the message is stored in the history records 48 in the database 28 connected to genealogy server 24. Then, branching through step 184, different particular actions are taken for different kinds of messages.

Validation request messages 90 are handled by a validation procedure starting at step 186. In step 188, the identifier provided in the validation request message is compared to genealogy records stored by genealogy server 24 in database 28, in area 50. From this, either a record will be found for the identifier, or no record will be found. If a record is found, then in step 190, a validation response message is generated, including a field 110 indicating that the identifier is valid, and a field 112 indicating the class of the part or subassembly that is affiliated with the identifier, for later evaluation by the production and process monitoring host 18 validation procedure as described above. If in step 188, the identifier cannot be matched to the genealogy records, then in step 192, a validation response message 106 is generated, including a field 110 indicating that the identifier is not valid. After the validation response message has been generated in step 190 or 192, then in step 194 the message is queued into area 56 of the database 28, for return to the production and process monitoring host 18.

Data storage messages 82 are handled by the steps starting with steps 200 and 206. When a data storage message 82 is received including process conditions in field 88, then handling of the message proceeds through step 200 to step 204, in which the process conditions in field 88 of the message are stored in area 52 of the database 28 attached to genealogy server 24, indexed by the identifier associated with that inspection data in field 84 of the data storage message 82. When a data storage message 82 is received, including inspection data in field 86, then handling of the message proceeds through step 206 to step 208, in which the inspection data in field 86 of the message is stored in area 54 of the database 28 attached to genealogy server 24, indexed by the identifier associated with that inspection data in field 84 of the data storage message 82. When a data storage message is received including both process conditions in field 102 and inspection data in field 100, then the steps beginning with steps 200 and 206 are both invoked, so that both the process conditions and inspection data are stored appropriately.

Identifier request messages 94 are handled by the steps starting at step 210. In step 212, a new record is created in genealogy database 28 in area 50, and a new, unique identifier is generated and assigned to the record. The part/subassembly class identified in field 96 of the message is stored into the new record so that the new record correctly identifies the newly-created part or subassembly. Next, in step 214, additional genealogy records are created to link the newly-created record, to the existing records for "child" parts or subassemblies that are identified in field 98 of the message. This step ensures that the genealogy database will not only identify the new subassembly or assembly that has been created, but also store an indication of the parts or subassemblies that were incorporated into that subassembly or assembly.

In step 216, if the message 94 includes inspection data in field 100, then the inspection data in field 100 of the message is stored in area 54 of the database 28 attached to genealogy server 24, indexed by the newly-generated identifier. In step 218, if the message 94 includes process conditions in field 102, then the process conditions in field 102 of the message are stored in area 52 of the database 28 attached to genealogy server 24, indexed by the newly-generated identifier.

In step 220, field 104 of the message 94 is evaluated to determine whether a label with the new identifier is to be printed. If so, then a print message or print job is generated, requesting that the printer identified in field 104 of the message produce a bar code for the new identifier. This print message is then forwarded to the identified printer, as appropriate. If the printer is directly connected to the genealogy server 24, then a print job is queued via the operating system of genealogy server 24 to print the bar code. If the printer is connected to and accessible from a print queue on the network 26 such as printer 32, then a print job is delivered to the network print queue so that it is forward to printer 32. If the printer is connected to production and process monitoring host 18 or to an MIU 12 connected to production and process monitoring host 18, then a print message is delivered to production and process monitoring host 18 where it will be handled by the print procedure described above in connection with FIG. 7C.

Figure 9:
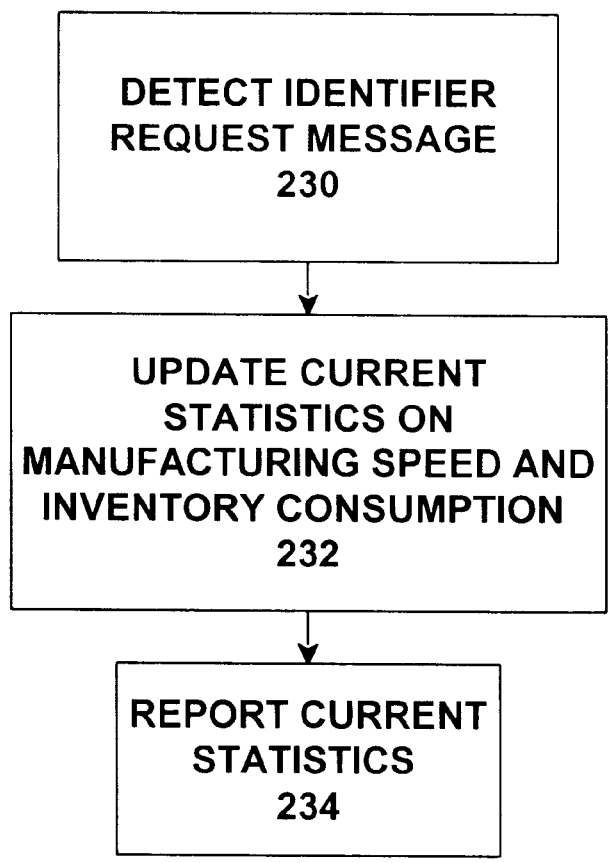
FIG. 9 is a flow chart of a statistical procedure performed to report on the inventory consumption and production and productivity of a manufacturing operation.

Referring now to FIG. 9, the collection of statistics on the manufacturing operation based on the foregoing operations can be discussed. The procedure of FIG. 9 can be performed by genealogy server 24, by procedure monitoring host 18, or by another computing system attached to network 26. In step 230, a new identifier request message 94 is detected. In step 232, this message, which identifies a class of assembly that has been created and the parts and subassemblies that were used, is used to update current statistics on the speed at which this class of part is being created. Furthermore, inventory levels for the parts and subassemblies consumed into the new assembly are reduced, and inventory levels for the assembly produced are increased. In step 234, the resulting statistics on inventory levels, manufacturing speed, and/or productivity are reported. With the foregoing detailed explanation, a few specific examples of applications of the foregoing system can be provided.

A first example is a manual inspection station, at which parts are manually inspected by a human inspector, and the results of the inspection are reported. At a station of this kind, an MIU is used to support a bar code scanner, to validate scanned parts, and to request inspection data from the inspector after the inspection has been concluded. Accordingly, the production and process monitoring host 18, for this application, would store in area 72 of its data storage, the following message sequence:

1. Scan of part of class X.
2. Delivery of inspection data from MIU.

Repeat

Furthermore, the production and process monitoring host 18 would store in area 74 of its data storage, the following responsive activity:

In response to (1), send validation request message 90, with scanned identifier, to genealogy server 24.

Confirm that part identifier sent in response to (1) is a valid identifier for a class X part.

Deliver screen display to MIU to request inspection data from inspector, including (a) grade of acceptable, marginal, unacceptable, (b) optional text comments from inspector.

In response to (2), send data storage message 82, with scanned identifier and inspection data, to genealogy server 24.

A second example is a 2-shot injection molding machine, at which parts are created from raw plastic using a 2-shot injection molding process. In accordance with a 2-shot process, a core is initially molded in a first cycle of the injection molding machine, and then an overmold on the core is produced in a second cycle of the injection molding machine. At a station of this kind, an MIU is used to detect cycles of the machine, and to detect machine process conditions including temperature and mold pressure, and a printer attached to the MIU is used to print bar codes to be placed on the newly-created part. Accordingly, the production and process monitoring host 18 for this application would store in area 72 of its data storage, the following message sequence:

1. MIU detects machine cycle (formation of core).
2. MIU detects machine cycle (formation of overmold).

Repeat.

Furthermore, the production and process monitoring host 18 would store in area 74 of its data storage, the following responsive activity:

In response to (1), collect process conditions from MIU

In response to (2), collect process conditions from MIU. Send identifier request message 94 to genealogy server 24, identifying class of two-shot molded part and process conditions from MIU, and requesting in field 104 a printout of a bar code for the new part at the printer attached to the MIU.

A third example is a manual assembly station, at which parts or subassemblies A, B, C and D are manually assembled by a human assembler. For the assembly to be correctly performed, part A should be retrieved first, and then parts B and C assembled to it (in either order), and finally part D assembled to the combination of A, B and C. At a station of this kind, an MIU is used to support a bar code scanner to validate parts being used by the assembler, and a printer attached to production and process monitoring host 18 is used to print a bar code for the resulting assembly. Accordingly, the production and process monitoring host 18, for this application, would store in area 72 of its data storage, the following message sequence:

1. Scan of part of class A.
2. Scan of part of class B or part of class C.
3. Scan of part of class C (if B scanned in 2) or part of class B
   (if C scanned in 2).
4. Scan of part of class D. Repeat.

Furthermore, the production and process monitoring host 18 would store in area 74 of its data storage, the following responsive activity:

In response to (1), send validation request message 90, with scanned identifier, to genealogy server 24.

Confirm that part identifier sent in response to (1) is a valid identifier for a class A part.

In response to (2), send validation request message 90, with scanned identifier, to genealogy server 24.

Confirm that part identifier sent in response to (2) is a valid identifier for a class B or C part.

In response to (3), send validation request message 90, with scanned identifier, to genealogy server 24.

Confirm that part identifier sent in response to (3) is a valid identifier for a class C part if a class B part was scanned in (2), or that the part identifier sent in response to (3) is a valid identifier for a class B part if a class C part was scanned in (2).

In response to (4), send validation request message 90, with scanned identifier, to genealogy server 24.

Confirm that part identifier sent in response to (4) is a valid identifier for a class D part.

Send identifier request message 94 to genealogy server 24, identifying in field 96 the class of the assembly produced by the human assembly step, identifying in field 98 the child part identifiers scanned in (1), (2), (3) and (4), and identifying the name of the current manual assembler as a process condition in field 102, and requesting in field 104 printout of a bar code for the new part at the printer attached to the production and process monitoring host 18.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A computerized system for tracking the activities of a manufacturing system, the manufacturing system performing a manufacturing process in which an assembly is assembled from parts or subassemblies, at least some of said parts or subassemblies being assembled into a subassembly in a first manufacturing step prior to combining said subassembly with additional parts or subassemblies in a second manufacturing step, the computerized system comprising a data storage system for storing identifiers for parts or subassemblies produced or used by said first and second manufacturing steps, a data processing system coupled to said data storage system, for generating data to be stored by said data storage system, the data processing system operating under control of a program to perform processing and storage operations as identified by said program, wherein the data processing system is responsive to said first and second manufacturing steps to produce and store in said data storage system, identifiers for subassemblies produced in said first manufacturing step in synchrony with completion of said subassemblies by said first manufacturing step, and produce and store in said data storage system, identifiers for assemblies produced in said second manufacturing step in synchrony with completion of said assemblies by said second manufacturing step.

2. The computerized system of claim 1 wherein said data processing system generates an identifier for a subassembly produced in said first manufacturing step before another subassembly is produced by said first manufacturing step.

3. The computerized system of claim 1 wherein said data processing system generates an identifier for an assembly produced in said second manufacturing step before another assembly is produced by said second manufacturing step.

4. The computerized system of claim 1 further comprising a printing system coupled to said data processing system, the printing system printing a machine-readable indicia in response to instructions from said data processing system, wherein said data processing system upon producing an identifier for an assembly or subassembly, delivers instructions to said printing system to print a machine-readable indicia reflecting said identifier.

5. The computerized system of claim 4 wherein said printing system prints indicia on stickers for transfer onto an assembly or subassembly.

6. The computerized system of claim 4 wherein said printing system scribes said machine-readable indicia onto said assembly or subassembly.

7. The computerized system of claim 1 further comprising an indicia reading system coupled to said data processing system, the indicia reading system reading a machine-readable indicia from a part or subassembly used in a manufacturing step, and delivering an identifier reflected in the indicia to said data processing system.

8. The computerized system of claim 7 wherein said data storage system also stores manufacturing step data, said manufacturing step data at least identifying parts or subassemblies used in a given manufacturing step, said indicia reading system is positioned within said manufacturing system to read indicia from parts or subassemblies being used in said given manufacturing step, and said data processing system, upon receipt of a read identifier from said indicia reading system as a part or subassembly is used in said given manufacturing step, retrieves from said data storage system, manufacturing step data for said given manufacturing step, and verifies that the part or subassembly associated with said read identifier is identified in said manufacturing data for said given manufacturing step.

9. The computerized system of claim 7 further comprising a warning system coupled to said data processing system, the warning system positioned within said manufacturing system, wherein said data processing system activates said warning system when a part or subassembly associated with said read identifier is not verified to be identified in said manufacturing data for said given manufacturing step.

10. The computerized system of claim 8 wherein said data processing system generates an identifier for the assembly or subassembly produced by said given manufacturing step when read identifiers for parts or subassemblies identified in said manufacturing data for said given manufacturing step have been verified.

11. The computerized system of claim 8 wherein said manufacturing step data further identifies an order in which parts or subassemblies are used in said given manufacturing step, and said data processing system, upon receipt of read identifiers from said indicia reading system as parts or subassemblies are used in said given manufacturing step, retrieves from said data storage system, manufacturing step data for said given manufacturing step, and determines whether the identifiers for the parts or subassemblies associated with said read identifiers, were received in an order in which said parts or subassemblies are to be used in said given manufacturing step.

12. The computerized system of claim 1 wherein, upon combination of a first part or subassembly produced by said first manufacturing step, into a first assembly during said second manufacturing step, said data processing system stores into said data storage system, an association between an identifier generated for said first part or subassembly to an identifier generated for said first assembly.

13. The computerized system of claim 1 wherein said data processing system includes sensors attached to said manufacturing system for collecting process condition measurements relating to performance of said first or second manufacturing steps.

14. The computerized system of claim 13 wherein said data processing system stores into said data storage system, collected process conditions measurements relating to a performance of a manufacturing step, said data processing system storing an association of said collected process conditions with an identifier generated for an assembly or subassembly produced during performance of said manufacturing step.

15. The computerized system of claim 1 wherein said data processing system includes a user interface for obtaining inspection information relating to said manufacturing system.

16. The computerized system of claim 15 wherein said data processing system stores into said data storage system, inspection information relating said manufacturing system's performance of a manufacturing step, said data processing system storing an association of said inspection information with an identifier generated for an assembly or subassembly produced during performance of said manufacturing step.

17. The computerized system of claim 1 wherein said data processing system determines a rate of generation of identifiers for assemblies or subassemblies produced during performance of a manufacturing step, and said data processing system forecasts future availability of assemblies or subassemblies produced by said manufacturing step based on the determined rate.

18. The computerized system of claim 1 wherein said data processing system includes sensors attached to said manufacturing system for detecting cycles of said manufacturing system indicative of completion of a given manufacturing step.

19. The computerized system of claim 18 wherein said data processing system generates an identifier for an assembly or subassembly produced by said given manufacturing step upon detection of completion of said given manufacturing step.

20. A computerized system for tracking the activities of a manufacturing system, the manufacturing system performing a manufacturing step in which an assembly is assembled from parts or subassemblies, the computerized system comprising
- a data storage system for storing identifiers for parts or subassemblies, and manufacturing step data including descriptions of parts or subassemblies used in said manufacturing step,
- a data processing system coupled to said data storage system, for generating data to be stored by said data storage system, the data processing system operating under control of a program to perform processing and storage operations as identified by said program,
- an indicia reading system coupled to said data processing system, the indicia reading system reading a machine-readable indicia from a part or subassembly used in said manufacturing step, and delivering an identifier reflected in the indicia to said data processing system,
- wherein said data processing system, upon receipt of a read identifier from said indicia reading system, retrieves from said data storage system, manufacturing step data for said manufacturing step, and verifies that the part or subassemblies associated with said read identifier is identified in said manufacturing data for said given manufacturing step.

21. The computerized system of claim 20 further comprising a warning system coupled to said data processing system, the warning system positioned within said manufacturing system, wherein said data processing system activates said warning system when a part or subassembly associated with said read identifier is not verified to be identified in said manufacturing data for said manufacturing step.

22. The computerized system of claim 20 wherein said data processing system generates an identifier for the assembly produced by said manufacturing step when read identifiers for parts or subassemblies identified in said manufacturing data for said manufacturing step have been verified.

23. The computerized system of claim 20 wherein
- said manufacturing step data further identifies an order in which parts or subassemblies are used in said given manufacturing step, and
- said data processing system, upon receipt of read identifiers from said indicia reading system, retrieves from said data storage system, manufacturing step data for said manufacturing step, and determines whether the identifiers for the parts or subassemblies associated with said read identifiers, were received in an order in which said parts or subassemblies are to be used in said given manufacturing step.

24. The computerized system of claim 20 wherein the data processing system produces and stores in said data storage system, identifiers for assemblies produced in said manufacturing step, in synchrony with completion of said assemblies by said manufacturing step.

25. The computerized system of claim 24 wherein said data processing system generates an identifier for an assembly produced in said manufacturing step before another assembly is produced by said manufacturing step.

26. The computerized system of claim 24 further comprising a printing system coupled to said data processing system, the printing system printing a machine-readable indicia in response to instructions from said data processing system,
- wherein said data processing system upon producing an identifier for an assembly, delivers instructions to said printing system to print a machine-readable indicia reflecting said identifier.

27. The computerized system of claim 26 wherein said printing system prints indicia on stickers for transfer onto an assembly.

28. The computerized system of claim 26 wherein said printing system scribes said machine-readable indicia onto said assembly or subassembly.

29. The computerized system of claim 24 wherein, upon incorporation of a part or subassembly into an assembly during said manufacturing step, said data processing system stores into said data storage system, an association between an read identifier for said part or subassembly and an identifier generated for said assembly.

30. The computerized system of claim 24 wherein said data processing system includes sensors attached to said manufacturing system for collecting process condition measurements relating to performance of said manufacturing step.

31. The computerized system of claim 30 wherein said data processing system stores into said data storage system, collected process conditions measurements relating to a performance of said manufacturing step, said data processing system storing an association of said collected process conditions with an identifier generated for an assembly produced during performance of said manufacturing step.

32. The computerized system of claim 24 wherein said data processing system includes a user interface for obtaining inspection information relating to said manufacturing system.

33. The computerized system of claim 32 wherein said data processing system stores into said data storage system, inspection information relating to said manufacturing system's performance of said manufacturing step, said data processing system storing an association of said inspection information with an identifier generated for an assembly produced during performance of said manufacturing step.

34. The computerized system of claim 24 wherein said data processing system includes sensors attached to said manufacturing system for detecting cycles of said manufacturing system indicative of completion of said manufacturing step.

35. The computerized system of claim 34 wherein said data processing system generates an identifier for an assembly produced by said manufacturing step upon detection of completion of said manufacturing step.

36. The computerized system of claim 20 wherein said data processing system determines a rate of generation of assemblies by said manufacturing step from a rate at which parts or subassemblies are verified by said data processing system, and said data processing system forecasts future availability of assemblies produced by said manufacturing step based on the determined rate.

37. A computerized system for tracking the activities of a manufacturing system, the manufacturing system performing a manufacturing step in which an assembly is assembled from parts or subassemblies, the computerized system comprising
- a data storage system for storing identifiers for parts or subassemblies, and manufacturing step data including descriptions of parts or subassemblies used in said manufacturing step,
- a data processing system coupled to said data storage system, for generating data to be stored by said data storage system, the data processing system operating under control of a program to perform processing and storage operations as identified by said program, an indicia reading system coupled to said data processing system, the indicia reading system reading a machine-readable indicia from a part or subassembly used in said manufacturing step, and delivering an identifier reflected in the indicia to said data processing system, wherein said data processing system determines that an assembly has been produced by said manufacturing step when read identifiers for parts or subassemblies identified in said manufacturing data for said manufacturing step have been verified.

38. The computerized system of claim 37 wherein said data processing system, upon receipt of a read identifier from said indicia reading system, verifies that the part or subassembly associated with said read identifier is identified in said manufacturing data for said given manufacturing step.

39. The computerized system of claim 38 further comprising a warning system coupled to said data processing system, the warning system positioned within said manufacturing system, wherein said data processing system activates said warning system when a part or subassembly associated with said read identifier is not verified to be identified in said manufacturing data for said manufacturing step.

40. The computerized system of claim 37 wherein
said manufacturing step data further identifies an order in which parts or subassemblies are used in said given manufacturing step, and
said data processing system, upon receipt of read identifiers from said indicia reading system, retrieves from said data storage system, manufacturing step data for said manufacturing step, and determines whether the identifiers for the parts or subassemblies associated with said read identifiers, were received in an order in which said parts or subassemblies are to be used in said given manufacturing step.

41. The computerized system of claim 37 wherein said data processing system, upon determining that an assembly has been produced, generates an identifier for said assembly.

42. The computerized system of claim 41 wherein said data processing system generates an identifier for an assembly produced in said manufacturing step before another assembly is produced by said manufacturing step.

43. The computerized system of claim 41 further comprising a printing system coupled to said data processing system, the printing system printing a machine-readable indicia in response to instructions from said data processing system,
wherein said data processing system upon producing an identifier for an assembly, delivers instructions to said printing system to print a machine-readable indicia reflecting said identifier.

44. The computerized system of claim 43 wherein said printing system prints indicia on stickers for transfer onto an assembly.

45. The computerized system of claim 43 wherein said printing system scribes said machine-readable indicia onto said assembly or subassembly.

46. The computerized system of claim 41 wherein, upon incorporation of a part or subassembly into an assembly during said manufacturing step, said data processing system stores into said data storage system, an association between an read identifier for said part or subassembly and an identifier generated for said assembly.

47. The computerized system of claim 41 wherein said data processing system includes sensors attached to said manufacturing system for collecting process condition measurements relating to performance of said manufacturing step.

48. The computerized system of claim 47 wherein said data processing system stores into said data storage system, collected process conditions measurements relating to a performance of said manufacturing step, said data processing system storing an association of said collected process conditions with an identifier generated for an assembly produced during performance of said manufacturing step.

49. The computerized system of claim 41 wherein said data processing system includes a user interface for obtaining inspection information relating to said manufacturing system.

50. The computerized system of claim 49 wherein said data processing system stores into said data storage system, inspection information relating to said manufacturing system's performance of said manufacturing step, said data processing system storing an association of said inspection information with an identifier generated for an assembly produced during performance of said manufacturing step.

51. The computerized system of claim 37 wherein said data processing system determines a rate of generation of assemblies by said manufacturing step from a rate at which parts or subassemblies are verified by said data processing system, and said data processing system forecasts future availability of assemblies produced by said manufacturing step based on the determined rate.

52. A computerized system for tracking the activities of a manufacturing system, the manufacturing system performing a manufacturing step in which an assembly is assembled from parts or subassemblies, the computerized system comprising
a data storage system for storing identifiers for assemblies,
a data processing system coupled to said data storage system, for generating data to be stored by said data storage system, the data processing system operating under control of a program to perform processing and storage operations as identified by said program, and including sensors attached to said manufacturing system for detecting cycles of said manufacturing system indicative of completion of said manufacturing step,
wherein said data processing system generates an identifier for an assembly produced by said manufacturing step upon detection of completion of said manufacturing step, and stores said identifier in said data storage system.

53. The computerized system of claim 52 wherein said data processing system generates an identifier each time completion of said manufacturing step is detected.

54. The computerized system of claim 52 wherein said data processing system generates an identifier for an assembly produced in said manufacturing step before another assembly is produced by said manufacturing step.

55. The computerized system of claim 52 further comprising a printing system coupled to said data processing system, the printing system printing a machine-readable indicia in response to instructions from said data processing system,
wherein said data processing system upon producing an identifier for an assembly, delivers instructions to said printing system to print a machine-readable indicia reflecting said identifier.

56. The computerized system of claim 55 wherein said printing system prints indicia on stickers for transfer onto an assembly.

57. The computerized system of claim 55 wherein said printing system scribes said machine-readable indicia onto said assembly or subassembly.

58. The computerized system of claim 52 wherein said data processing system includes sensors attached to said manufacturing system for collecting process condition measurements relating to performance of said manufacturing step.

59. The computerized system of claim 58 wherein said data processing system stores into said data storage system, collected process conditions measurements relating to a performance of said manufacturing step, said data processing system storing an association of said collected process conditions with an identifier generated for an assembly produced during performance of said manufacturing step.

60. The computerized system of claim 52 wherein said data processing system includes a user interface for obtaining inspection information relating to said manufacturing system.

61. The computerized system of claim 60 wherein said data processing system stores into said data storage system, inspection information relating to said manufacturing system's performance of said manufacturing step, said data processing system storing an association of said inspection information with an identifier generated for an assembly produced during performance of said manufacturing step.

62. The computerized system of claim 52 wherein said data processing system determines a rate of generation of assemblies by said manufacturing step from a rate at which identifiers are generated by said data processing system, and said data processing system forecasts future availability of assemblies produced by said manufacturing step based on the determined rate.

63. A method of tracking the activities of a manufacturing system, the manufacturing system performing a manufacturing process in which an assembly is assembled from parts or subassemblies, at least some of said parts or subassemblies being assembled into a subassembly in a first manufacturing step prior to combining said subassembly with additional parts or subassemblies in a second manufacturing step, the method comprising storing identifiers for parts, subassemblies or assemblies produced or used by said first and second manufacturing steps, monitoring said first and second manufacturing steps and in response producing and storing identifiers for subassemblies produced in said first manufacturing step in synchrony with completion of said subassemblies by said first manufacturing step, and producing and storing identifiers for assemblies produced in said second manufacturing step in synchrony with completion of said assemblies by said second manufacturing step.

64. A method of tracking the activities of a manufacturing system, the manufacturing system performing a manufacturing step in which an assembly is assembled from parts or subassemblies, the method comprising storing identifiers for parts or subassemblies, and manufacturing step data including descriptions of parts or subassemblies used in said manufacturing step, reading a machine-readable indicia from a part or subassembly used in said manufacturing step, and determining an identifier reflected in the indicia, retrieving from said data storage system, manufacturing step data for said manufacturing step, and verifying that the part or subassembly associated with said read identifier is described in said manufacturing data for said given manufacturing step.

65. A method of tracking the activities of a manufacturing system, the manufacturing system performing a manufacturing step in which an assembly is assembled from parts or subassemblies, the method comprising storing identifiers for parts or subassemblies, and manufacturing step data including descriptions of parts or subassemblies used in said manufacturing step, reading a machine-readable indicia from a part or subassembly used in said manufacturing step, and determining an identifier reflected in the indicia, determining that an assembly has been produced by said manufacturing step when read identifiers for parts or subassemblies described in said manufacturing data for said manufacturing step have been verified.

66. A method of tracking the activities of a manufacturing system, the manufacturing system performing a manufacturing'step in which an assembly is assembled from parts or subassemblies, the method comprising storing identifiers for assemblies, detecting cycles of said manufacturing system indicative of completion of said manufacturing step, generating an identifier for an assembly produced by said manufacturing step upon detection of completion of said manufacturing step, and storing said identifier.

\* \* \* \* \*

UNITED STATES PATENT AND TRADEMARK OFFICE
CERTIFICATE OF CORRECTION

PATENT NO.    : 6,381,509 B1
DATED         : April 30, 2002
INVENTOR(S)   : Brian M. Thiel et al.

It is certified that error appears in the above-identified patent and that said Letters Patent is hereby corrected as shown below:

Column 1,
Line 9, replace "modem" with -- modern --.
Line 29, replace "number on" with -- number of --.
Line 43, remove indent, the word "Nagaoka" should not start a new paragraph.

Column 2,
Line 38, replace "assemblies, that" with -- assemblies that --.
Line 66, replace "by a placing a hand" with -- by placing a hand --.

Column 3,
Line 11, replace "any kind manufacturing" with -- any kind of manufacturing --.

Column 4,
Line 54, replace "OF THE DRAWING" with -- OF THE DRAWINGS --.

Column 6,
Line 33, replace "MTU'S" with -- MIU's --.

Column 11,
Lines 34-37, replace "each procedure responsive to specific types of messages, for the purposes of" with -- each procedures is responsive to specific types of messages. For the purposes of --.

Column 12,
Line 52, replace "so that it is forward to printer" with -- so that it is forwarded to printer --.

Column 13,
Line 38, replace "with a2-shot process" with -- with a 2-shot process --.
Line 57, replace "from MIU" with -- from MIU --.

UNITED STATES PATENT AND TRADEMARK OFFICE
CERTIFICATE OF CORRECTION

PATENT NO.    : 6,381,509 B1
DATED         : April 30, 2002
INVENTOR(S)   : Brian M. Thiel et al.

It is certified that error appears in the above-identified patent and that said Letters Patent is hereby corrected as shown below:

<u>Column 14,</u>
Line 14, the word "Repeat." should be on its own line.
Line 55, replace "applicant's" with -- applicants' --.

<u>Column 22,</u>
Line 35, replace "manufacturing'" with -- manufacturing --.

Signed and Sealed this

Nineteenth Day of November, 2002

*Attest:*

*Attesting Officer*

JAMES E. ROGAN
*Director of the United States Patent and Trademark Office*